Patented May 15, 1934

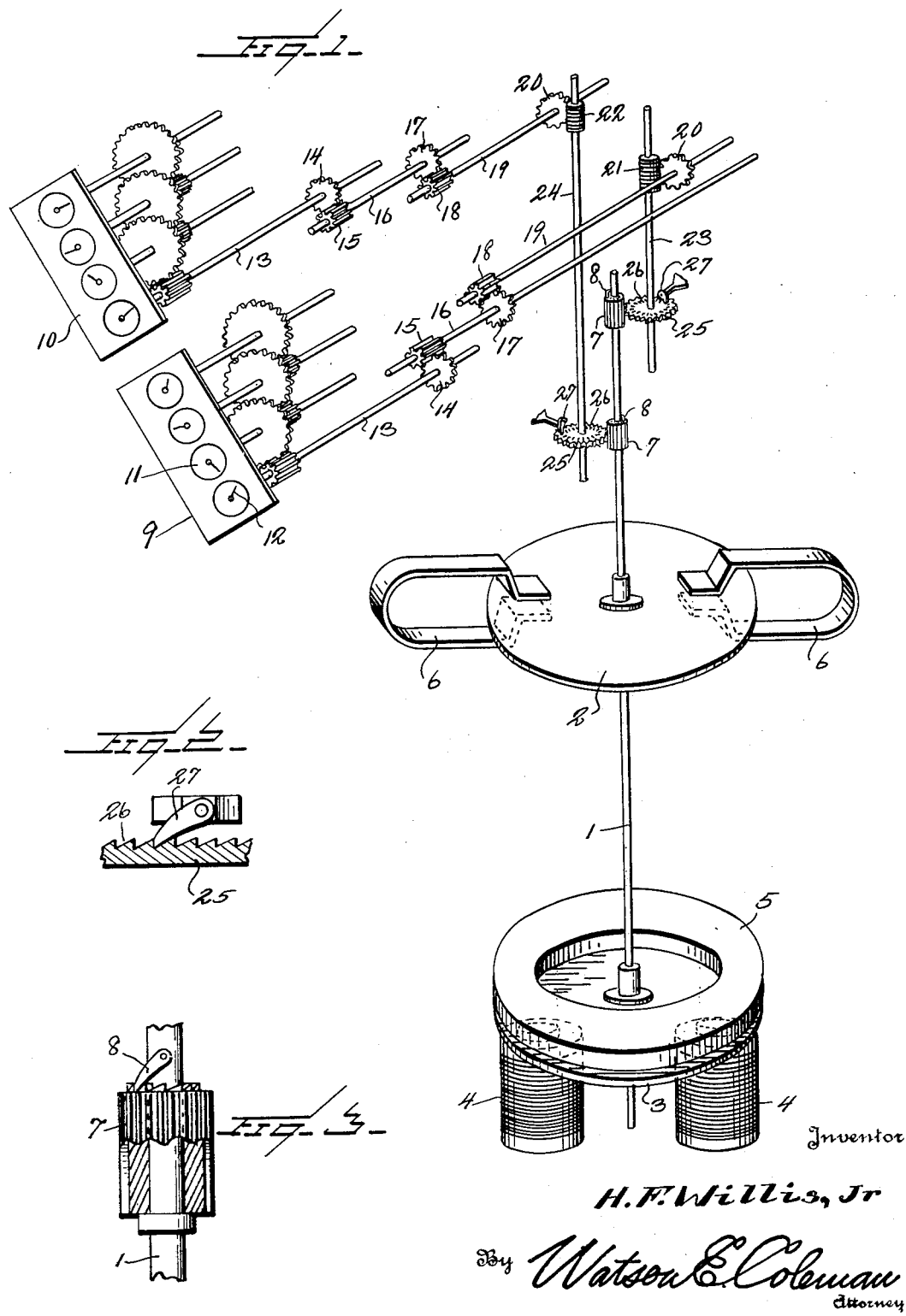

1,958,651

UNITED STATES PATENT OFFICE 1,958,651

ELECTRIC METER

Henry F. Willis, Jr., Carbondale, Ill.

Application October 17, 1931, Serial No. 569,524
Renewed November 2, 1933

1 Claim. (Cl. 171—34)

This invention relates to electrical measuring instruments and pertains particularly to an electric meter.

The primary object of the present invention is to provide a mechanism which is designed to be used for registering the amount of current flowing in two directions in a current carrying line, the device being designed primarily for registering the amount of energy passing in either direction through tie lines between generating units or plants or lines supplying the power to regenerative equipment, or on locomotives where current flows in one direction while the motors are pulling and is generated to flow in the opposite direction by the reversal of the motors when the engine is allowed to coast down a grade, and in any other capacities where it is desirable that a record be maintained of current passing in either direction through a line.

A further object of the invention is to provide an electric meter having two sets of gear trains, one for measuring incoming and the other for measuring outgoing current, in which the shifting of certain parts of the mechanism in accordance with the direction of flow of the current is accomplished through the medium of plates or disks controlled in the same manner as the usual driven and drag disks of a meter of ordinary type.

A further object of the invention is to provide a mechanism of the above described character which is designed to accurately record the quantity of current flowing through a line in which the meter is connected, no matter how rapidly the direction of flow of the current changes.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a diagrammatic perspective view of the structure embodying the present invention;

Figure 2 is a detailed sectional view through a portion of one of the pawl controlled gear elements showing the connection of the pawl therewith;

Figure 3 is a detailed view partly in section and partly in elevation of one of the pawl controlled pinion gears.

Referring now more particularly to the drawing, wherein like numerals of reference indicate corresponding parts throughout the several views, the numeral 1 indicates the usual disk carrying shaft of a Watt-hour meter, upon which are mounted the upper and lower disks 2 and 3. The disk 3 forms a part of the driving mechanism which includes a pair of electro-magnets 4 which are disposed beneath the same and a steel body 5 which is located above the same. The rate of rotation of the shaft 1 is governed by the usual pair of permanent magnets 6 between the poles of which the upper disk 2 rotates.

The shaft 1 has mounted thereon a pair of gear pinions each of which is indicated by the numeral 7 and these pinions are loose on the shaft but are prevented from turning in one direction by pawl and ratchet mechanism 8 which is associated with each.

The pawls of the mechanisms 8 are preferably carried by the shaft to engage the ratchet teeth formed upon or carried by the pinions. As shown, the pawl and ratchet mechanism of one pinion is arranged to secure the pinion for clockwise rotation with the shaft and free it when the shaft rotates in a counter-clockwise direction, while the mechanism associated with the other pinion couples the same with the shaft when the latter rotates in a counter-clockwise direction and frees it when the shaft rotates in a clockwise direction.

The meter is provided with two sets of gear trains or registering mechanisms which are indicated by the numerals 9 and 10, one of which mechanisms is for the registration of incoming power and the other for registration of outgoing power. Each of these registering mechanisms consists of the usual dials 11 over the face of each of which rotates an indicator 12 to which is attached a shaft 13 and these shafts of the various indicators are geared together in the usual manner, the first shaft of each gear train being coupled through the medium of a gear 14 with a pinion 15 upon an adjacent shaft 16 which in turn is coupled through a gear 17 with a pinion 18 upon a shaft 19 which is connected through the medium of a gear 20 with one of a pair of worms 21 and 22 which are carried by vertically disposed shafts 23 and 24 located adjacent and parallel with the disk shaft 1.

Each of these shafts 23 and 24 carries a gear 25 which meshes with one of the pinions 7 in the manner illustrated and each of these gears has one face provided with ratchet teeth 26 with which are connected pawls 27 mounted upon a suitable fixed support adjacent the gear. These pawls 27 and ratchets 26 permit of the rotation of the gears 25 in one direction only.

From the foregoing it will be readily apparent that when the current is flowing in the proper direction through the electro-magnets 4 to turn the shaft 1 in a clockwise direction, the pawl and ratchet mechanism 8 of one of the gear pinions as for example the lower pinion which is connected through the medium of the adjacent gear with the shaft 24, will be held and turned in a clockwise direction and the registering mechanism 10 which is connected with the gear 24 will be operated. Since the other gear pinion 7 is not coupled with the shaft 1 the latter turns in a clockwise direction, the mechanism 9 which is associated therewith will remain idle. When the current flowing through the magnets 4 is reversed so that the shaft 1 turns in a counter-clockwise direction, the pinion and gear 25 connected with the shaft 24 will remain idle while the other pinion 7 and gear 25 which are connected with the shaft 23, will be secured for rotation and the mechanism 10 will cease operating while the mechanism 9 will begin to register. It will thus be seen that with the present meter structure the amount of current flowing in either direction through the line in which the meter is connected, will be recorded upon the registering mechanisms 9 and 10.

While in the present case the two electro-magnets have been shown as associated with the lower disk and the fixed magnets with the upper disk, it will, of course, be understood that there may be a fixed magnet and an electro-magnet associated with each disk in the same manner as illustrated in the co-pending applications, filed of even date herewith and bearing Serial Numbers 569,522 and 569,523, in which case the mechanism will appear as that of a polyphase KWH meter.

Having thus described the invention, what is claimed is:—

In an electric meter having a rotating disk shaft, means for measuring current flowing in either direction, comprising a pair of metering trains, a pair of pinion gears mounted upon said shaft, a pawl and ratchet connection between each pinion gear and said shaft whereby one pinion only will be turned by the shaft when the same is rotated in a clockwise or counter-clockwise direction, a pair of shafts each connected with a gear train, a gear carried by each shaft of said pair and having toothed connection with a pinion, ratchet teeth formed in one surface of each of said gears and a pawl associated with each of said gears and engaging the ratchet teeth thereof, said first shaft when turning in either direction effecting the operation of one only of the gear trains.

HENRY F. WILLIS, Jr.